Dec. 24, 1968     S. A. FRANCIS     3,417,619
SINGLE WIRE MEASURING DEVICE FOR BATHYTHERMOGRAPH SYSTEM
Filed Jan. 24, 1966
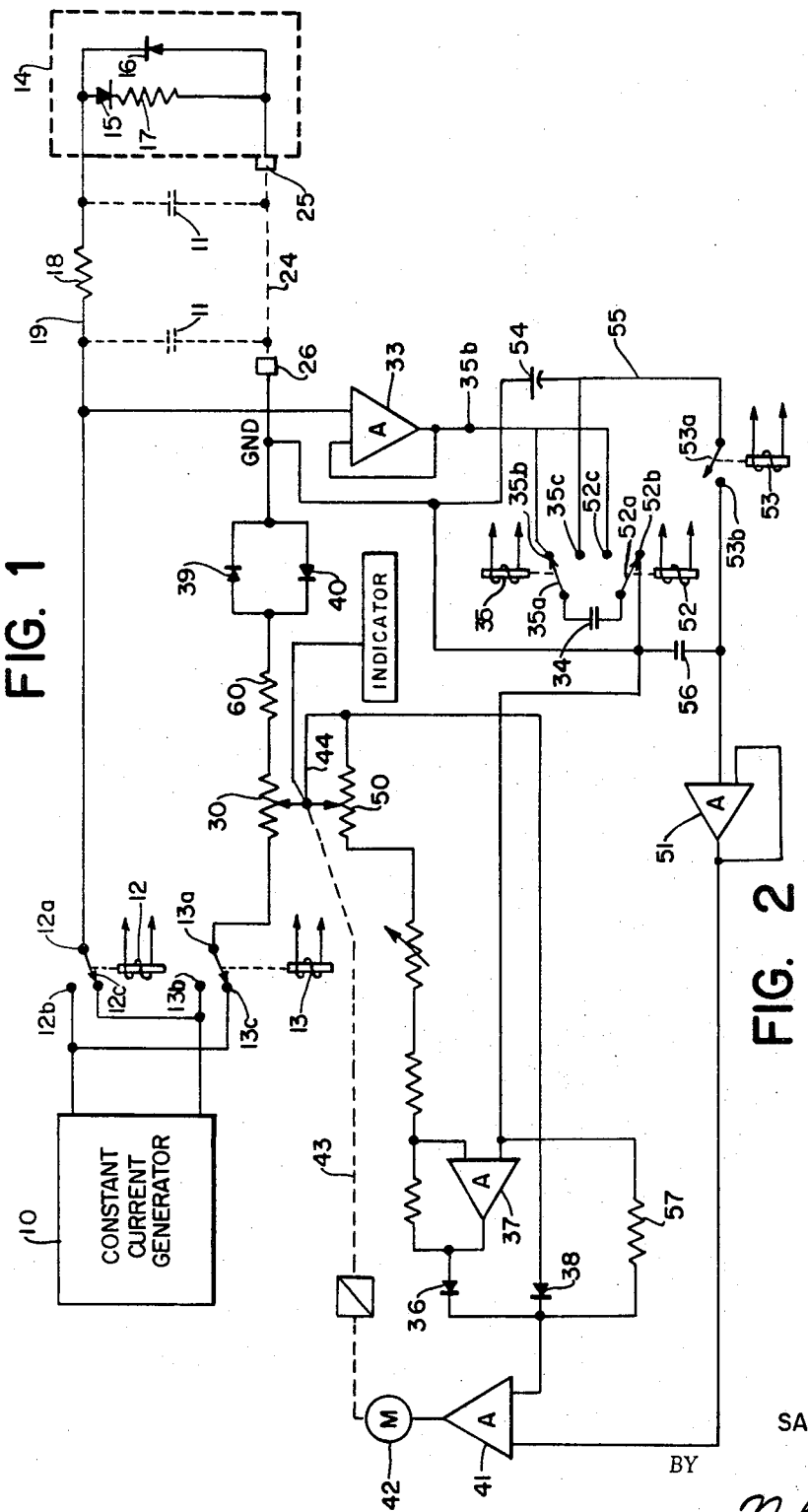
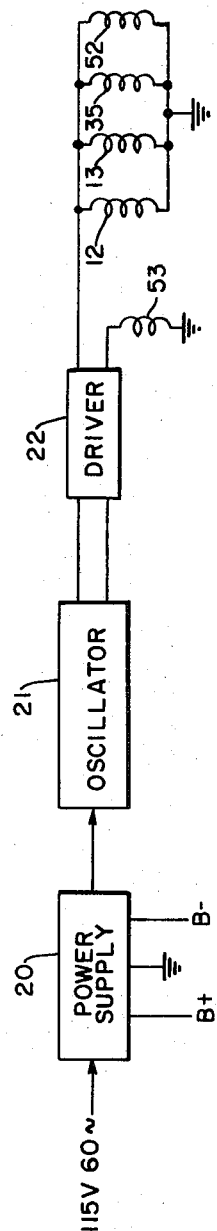
INVENTOR.
SAMUEL A. FRANCIS
BY
*Nolte and Nolte*
ATTORNEYS

United States Patent Office 3,417,619
Patented Dec. 24, 1968

3,417,619
SINGLE WIRE MEASURING DEVICE FOR
BATHYTHERMOGRAPH SYSTEM
Samuel A. Francis, Marion, Mass., assignor to The Buzzards Corporation, Marion, Mass., a corporation of Massachusetts
Filed Jan. 24, 1966, Ser. No. 522,505
8 Claims. (Cl. 73—362)

ABSTRACT OF THE DISCLOSURE

A condition sensing resistance in a sensor probe is connected by a single wire and a sea return path to a known resistance within the measuring system. The sensing resistance is supplied through the transmission path with a constant current. Polarity sensitivity switches are connected in a circuit in such a manner that unipolar constant amplitude current pulses alternately flow through the known and unknown resistances in opposite directions. By measuring the difference in the signal amplitudes developed across the known and unknown resistance, an error signal can be obtained. The error signal is then amplified by a servo amplifier and a drive motor which then repositions the known resistance to produce a zero error voltage. The actual adjustment of the resistance then provides a direct indication of the actual fluid condition being measured.

This invention relates to an apparatus for measuring the properties of a body of water fluid from a remote location using a single conductor.

More particularly this invention relates to an electronic measuring circuit for measuring the properties of a body of fluid from a remote location employing a sensing probe deployed in the body of fluid and connected to the apparatus by means of a single conductor.

Although not necessarily so limited, the present invention has particular utility in a bathythermograph probe of the type illustrated in U.S. patent application Ser. No. 342,338, now Patent No. 3,221,556 of Campbell et al., filed on Jan. 31, 1964. That application discloses apparatus for deploying a sensor probe into a body of water and continuously detecting changes in a particular property of the water as the probe traverses the water. For example the device is particularly useful in recording temperature as a function of depth which is of interest to persons concerned with the operation of Sonar devices such as weapon systems and fish detecting apparatus.

According to application Ser. No. 342,338, an expendible probe includes a property sensing device such as a thermistor, the resistance of which is dependent upon temperature and connected by wire to a source of potential on the launching vessel. The probe is cast into the water and the wire is deployed from the vessel and the probe. As the probe falls through the water, the potential difference causes by the change in thermistor resistance is recorded on a chart recorder wherein the record medium is advanced at a rate proportional to the known rate of descent of the probe. One feature of that invention is the use of the water itself as a sea return path thus eliminating a return wire which would normally be necessary.

When the probe is launched, a considerable length of wire is normally deployed so that the resistance of the wire changes significantly due to the range of temperature encountered. It is therefore necessary to provide some means to compensate for the resistance changes of the wire so that measuring apparatus will only be responsive to the resistance changes of the thermistor.

Accordingly, a measuring system is provided for use with a single wire sensor probe wherein the deleterious effects due to the variable characteristics of the sensing wire may be avoided without resort to a separate compensating wire. Briefly, according to this invention, a property sensing resistance in the probe is connected by a single wire and a sea return path to a known resistance within the measuring system. The variable unknown resistance to be measured is supplied through the transmission path with a constant current. Polarity sensitivity switches are connected in a circuit in such a manner that unipolar constant amplitude current pulses alternately flow through the known and unknown resistances in opposite directions. By measuring the difference in the respective signal amplitudes developed across the known and unknown resistance, as error signal can be obtained. The error signal is then amplified by a servo amplifier and a drive motor which then repositions the known resistance to produce a zero error voltage. The actual adjustment of the resistance then provides a direct indication of the actual fluid property being measured.

The higher the pulse frequencies producing the current reversal within the sensing element of the probe, the more frequent the measurements and thus the greater the resolution of the property measured as the probe descends. However, in an AC or pulse type device, a unique problem occurs due to the existance of a wire-to-water shunt capacitance. This capacitance becomes considerable where a long length of wire has been deployed into the water thereby increasing the rise time of the applied pulses to limit the frequency response of the resolution of the entire device.

Accordingly an object of the present invention is to provide a measuring device of the class described wherein a separate wire is not required to compensate for the variable resistance characteristics of the transmission path.

Another object of the invention is to provide a single wire sea return measuring device for recording a property of the ocean as a function of depth.

Yet another object of the present invention is to provide a measuring apparatus for measuring the properties of a body of fluid from a remote location over a single conducting path by automatically measuring the resistance of the sensing element within the probe for each depth to which the probe descends.

Other objects and features of the present invention will become apparent from the following detailed description considered in connection with the accompanying drawings which disclose the embodiments of the present invention. It should be understood, however, that the drawings are designed for purposes of illustration only and not as a definition of the limits of the invention as to which reference should be made to the appended claims.

In the drawings, wherein similar reference characters denote similar elements throughout the several views:

FIG. 1 is a schematic diagram of the measuring apparatus according to the invention for measuring the properties of a fluid at a remote location from a single conductor; and FIG. 2 is a block diagram of the power supply connections according to the invention for sampling the resistance of the probe.

Referring to FIG. 1 there is shown a constant current generator 10 coupled to transmission line 19 and probe 14 (shown in dotted lines). Transmission line 19 consists of a single wire insulated conductor having an equivalent resistance 18 and parallel capacitors 11 connected between line 19 and the fluid medium 24. Capacitors 11 are representative of the capacitance which exists between line 19 and the sea, the effects of which are explained in greater detail below. Probe 14 may consist of a ballistically shaped object adapted to be deployed into a body of water and descend through the water to provide readings at various depths. The probe contains a resistive sensing element 17 coupled at one end to the body of the probe 25 and through uni-directional diode 15 to conductor 19. A second diode 16, shown inverted with respect to the polarity of diode 15, is connected across the series combination of diode 15 and sensing element 17. The body of the probe 25 consists of a metallic or conductive shell which is in contact with the body of fluid 24 in which the probe is deployed. The measuring equipment is also grounded to the sea at a remote location through conductor 26. Constant current generator 10 is alternately coupled to lead 19 of the probe through the double-pole double-throw switching action of relays 12 and 13. Relay 12 operates relay contact arm 12a between terminals 12b and 12c. Relay 13 simultaneously operates contact arm 13a to switch between contacts 13c and 13b so that the polarity of the current applied to conductor 19 is cycled. Completing the current path to the probe through conductor 26 are a pair of back-to-back diodes 39 and 40 connected in series through fixed resistor 60 to sliding resistor 30 forming part of a reference potentiometer 44, which samples the voltage produced by the current through the probe to provide a reference voltage. Thus for one cycle of operation, the current flows through conductor 19 (having an equivalent resistance 18), diode 15, sensing element or thermistor 17, the sea water return path 24, diode 40, resistor 60 and through reference potentiometer 30 during the first half-cycle of operation. At the completion of this cycle, the opposite current of the same magnitude is caused to flow through reference potentiometer 30, resistor 60, diode 39, the sea return path 24, diode 16 and resistor 18 forming the equivalent resistance of conductor 19. Diodes 15 and 16 form a matched pair within probe 14 so that the difference in potential produced across resistor 30 for each cycle of operation will be substantially a function of the potential drop across thermistor element 17 alone.

An amplifier 33 is shown having its input coupled to conductor 19 within the measuring and recording apparatus. Amplifier 33 thus samples the potential developed across conductor 19 for each cycle of operation of applied current.

When relays 12, 13, 35 and 52 are in the de-energized state, so that relays 35 and 52 are in the positions shown, the potential sampled by amplifier 33 is applied across capacitor 34.

When relays 12, 13, 35 and 52 are energized, so that relay arm 35a contacts terminal 35c, and arm 52a contacts terminal 52c, amplifier 33 adds its output to the potential previously stored on capacitor 34, as described above, to produce a resulting potential to charge capacitor 54. This resulting potential is proportional to the algebraic sum of the previous half-cycle voltage stored on capacitor 34 and the present reversed-polarity half cycle, providing capacitor 54 is small compared to capacitor 34. Simple analysis shows that the matched diode and conductor drops add to zero, leaving a voltage proportional to that of the sensing element. This difference potential is coupled by relay 53 into store and hold capacitor 56, and thence to the high input impedance gain-of-one amplifier 51. The output of amplifier 51 feeds this potential to the input of servo amplifier 41, for nearly continuous comparison with a reference potential produced by the current pulses across potentiometer 30 in the probe measuring circuit. The reference potential changes polarity with the change in current for each cycle. The reference potential is sampled by potentiometer 50 from potentiometer 30 through contact arm 44 and fed into the input of inverter amplifier 37 which converts the negative half-cycle potential sampled to a positive signal and passes the signal by means of diode 36 amplifier 41. The positive half-cycle portion of the reference voltage is merely gated past amplifier 37 to the input of amplifier 41 by means of diode 38. The potential drops created across diodes 36 and 38 by current flow into load resistor 57 are balanced out by diodes 39 and 40 so as to effectively cancel out the temperature effects of the diodes.

Servo amplifier 41, shown coupled to drive motor 42, amplifies the potential difference between the reference and measured potentials. Drive motor 42 is operatively connected through shaft 43 to sliding contact arm 44 coupled to reference potentiometers 30 and 50, so that it may reposition the reference voltage until a null voltage is established across amplifier 41. Thus the magnitude of the reference voltage, or the displacement of sliding contact arm 44, is a direct indication of the magnitude of the potential across sensing element 17. It is obvious that if sensing element 17 were a thermistor, contact arm 44 may be directly calibrated in temperature.

The reference potentiometer is divided into two potentiometers 30 and 50 in order to provide a means for maintaining the output impedance of the measuring circuit relatively constant during measurements of the sampling voltage. It is conceivable that impedance transformers may be substituted in place of the reference potentiometers to accomplish the same purpose. This is necessary to maintain the gain of amplifier 37 equal to one, over the range of variation of potentiometer 30.

FIG. 2 shows a typical power supply 20 provided with line voltage from a standard source such as a 115 volt 60 cycle source and produces at its output B+ and B− voltages to supply the amplifiers in the circuit configuration of FIG. 1. Power supply 20 also supplies power to oscillator 21 which is connected to driver 22 which provides at its output, power to simultaneously energize relay coils 12, 13, 35 and 52.

The energization of relay 53 is through a separate delayed driver source. This delay and isolation is introduced in oscillator 21 to permit the potential to stabilize across capacitor 54 before being sampled by capacitor 54 and amplifier 51 and to maintain a nearly-uninterrupted signal at amplifier 51 during subsequent half-cycle recharging of capacitors 34 and 54. The cycling of the relays which produces the current reversal within the measuring circuit to provide the changes of resistance of the sensing element of the probe, is responsive to the frequency of the oscillator 21.

When the probe is initially deployed in the fluid medium, the length of conductor 19 in contact with the sea is very short so that inter-electrode capacitance 11 between insulated conductor 19 and the sea is at a minimum. It is, thus, possible to provide current reversals and therefore measure the resistance of the sensing element at relatively high frequencies. However, as more and more of conductor 19 is deployed into the water, the inter-electrode capacitance between the conductor and the sea increases so that it is necessary to decrease the frequency of oscillation in order to obtain steady state readings of the resistance of the sensing element. In the actual construction, when more than one mile of conductor has been deployed, it has been found that the frequency of sampling must be reduced to between 5 and 10 cycles per second in order to permit the cycling current to stabilize sufficiently to make readings of the sensing element. Relay 53 may be operated to close only during part of each measuring cycle to permit the potential occurring on line 55 to be sampled only after the potential stabilizes. Thus when the potential is sampled in this matter, it is possible to obtain stable and accurate measurements of the properties sensed by the resistive sensing element 17 mounted in the probe.

While only a single embodiment of the present invention has been shown and described it will be understood that many changes and modifications may be made therein without departing from the spirit of the invention as defined by the appended claims.

I claim:

1. A single wire sea return apparatus for measuring the temperature of water as a function of depth comprising a sensor adapted to be deployed into the water, a property measuring resistive element located within said sensor, a first diode in series with said resistive element, a second oppositely poled diode connected across the series connection of said resistive element and said first diode, means for generating current pulses of alternating polarity, a wire conductor connecting said resistive element to said current pulses generating means, said resistive element being returned to said current pulses generating means through a sea return path, reference potentiometer means connected to said current pulses generating means, means for applying said current pulses of first polarity through said conductor, said reference potentiometer, resistive element and first diode, means for applying said current pulses of opposite polarity through said second diode and reference potentiometer means, a measuring circuit coupled to said wire at a local station, a capacitor coupled to the output of said measuring circuit for storing said pulses of first polarity means for subtracting said pulses of opposite polarity from said pulses of first polarity stored on said capacitor to produce a difference potential, means responsive to said difference potential for varying the reference potentiometer means whereby to null balance said apparatus.

2. The apparatus as recited in claim 1 wherein said resistive sensing means comprises a thermistor for sensing the temperature changes of the water.

3. The apparatus as recited in claim 1 wherein said means responsive to said difference potential comprises a servo amplifier for sensing the variation between said difference potential stored on said capacitor and the potential sensed by said reference potentiometer means, and a servo motor coupled to the output of said servo amplifier for adjusting said reference potentiometer means responsive to the variation in potential applied to said servo amplifier.

4. The apparatus as recited in claim 3 wherein said reference potentiometer means includes an indicator for providing an indication of the displacement of the reference potentiometer means to produce said null balance and thereby indicate the magnitude of the property measured by the probe.

5. The apparatus as recited in claim 3 wherein said reference potentiometer means comprises a first variable resistor coupled in said measuring circuit, a second variable resistor having its moving element responsive to the moving element of said first variable resistor and having its output coupled to an input of said servo amplifier.

6. The apparatus as recited in claim 5 additionally including an inverter amplifier having its input coupled to said second variable resistor, said amplifier inverting the polarity of one of said two pulses to match the polarity of said difference potential stored in said second capacitor.

7. The apparatus as recited in claim 1 wherein said means for generating current pulses comprises a constant current source coupled to chopper means for reversing the polarity of said current source with respect to said sensor.

8. The apparatus as recited in claim 7 wherein said means for applying current pulses includes an oscillator, a driver coupled to said oscillator for operating said chopper means, and means for varying the frequency of said oscillator to compensate for impedance changes in the wire.

References Cited

UNITED STATES PATENTS

| | | | |
|---|---|---|---|
| 2,508,478 | 5/1950 | Uehling | 73—362 |
| 2,741,126 | 4/1956 | Anderson et al. | 73—170 |
| 3,098,993 | 7/1963 | Coop | 73—170 |
| 3,221,556 | 12/1965 | Campbell et al. | 73—362 |
| 3,273,393 | 9/1966 | Spark | 73—170 |
| 3,339,407 | 9/1967 | Campbell et al. | 73—170 |
| 3,135,943 | 6/1964 | Richard | 73—170 XR |
| 3,364,744 | 1/1968 | McMahon | 73—362 |

S. CLEMENT SWISHER, *Acting Primary Examiner.*

FREDERICK SHOON, *Assistant Examiner.*

U.S. Cl. X.R.

73—170, 343